United States Patent [19]

Ohba

[11] Patent Number: 5,223,558
[45] Date of Patent: Jun. 29, 1993

[54] PROCESS FOR PREPARATION OF HIGH-MOLECULAR-WEIGHT EPOXY DIMER ACID ESTER RESIN

[75] Inventor: Kaoru Ohba, Susono, Japan

[73] Assignee: The Dow Chemical Company, Midland, Mich.

[21] Appl. No.: 914,649

[22] Filed: Jul. 15, 1992

Related U.S. Application Data

[63] Continuation of Ser. No. 816,778, Jan. 2, 1992, abandoned, which is a continuation of Ser. No. 619,810, Nov. 27, 1990, abandoned, which is a continuation of Ser. No. 468,033, Jan. 22, 1990, abandoned.

[51] Int. Cl.$^5$ ............... C08G 59/42; C08G 59/12
[52] U.S. Cl. ............... 523/456; 525/530; 528/104; 528/111.3; 528/365
[58] Field of Search ............... 528/104, 111.3, 365; 525/530; 523/456

[56] References Cited

U.S. PATENT DOCUMENTS

| | | | |
|---|---|---|---|
| 2,970,972 | 2/1961 | Wear et al. | 528/111.3 X |
| 3,219,602 | 11/1965 | Scheibli | 528/111.3 |
| 3,308,076 | 3/1967 | De Lia et al. | 528/111.3 X |
| 3,374,193 | 3/1968 | Tsatsos et al. | 528/111.3 X |
| 3,888,808 | 6/1975 | Downs et al. | 528/111.3 X |
| 4,107,116 | 8/1978 | Riew et al. | 528/111.3 |
| 4,119,595 | 10/1978 | Bauer et al. | 260/21 |
| 4,141,865 | 2/1979 | Bogan | 528/111.3 X |
| 4,421,906 | 12/1983 | Waddill et al. | 528/111.3 X |
| 4,467,070 | 8/1984 | Kordomenos et al. | 525/510 |
| 4,476,259 | 10/1984 | Kordomenos | 528/104 X |
| 4,478,985 | 10/1984 | Bekodij et al. | 528/111.3 X |
| 4,486,555 | 12/1984 | Kordomenos et al. | 525/510 |
| 4,491,641 | 1/1985 | Kordomenos et al. | 525/514 |
| 4,508,868 | 4/1985 | Whyzmuzis et al. | 524/607 |
| 4,596,861 | 6/1986 | Sheih et al. | 528/104 X |
| 4,602,053 | 7/1986 | Huybrechts et al. | 523/436 |
| 4,683,262 | 7/1987 | Whyzmuzis et al. | 524/608 |
| 4,722,963 | 2/1988 | Whyzmuzis et al. | 524/606 |
| 4,786,666 | 11/1988 | Cecil et al. | 523/427 |

FOREIGN PATENT DOCUMENTS

| | | | |
|---|---|---|---|
| 569227 | 1/1959 | Canada | 523/111.3 |
| 0097452 | 1/1984 | European Pat. Off. | |
| 0114425 | 8/1984 | European Pat. Off. | |
| 758146 | 10/1956 | United Kingdom | 528/111.3 |

OTHER PUBLICATIONS

Computer printout from Derwert data base of abstract of JP-59-126471-A.
Computer printout from Derwert data base of abstract of JP-63-020311-A.

*Primary Examiner*—John C. Bleutge
*Assistant Examiner*—Frederick Krass

[57] ABSTRACT

A process for preparing an epoxy dimer acid ester resin, which comprises reacting (a) an epoxy resin which is a glycidyl ether of a dihydric phenol having a weight average molecular weight of 1,000 to 30,000 and an epoxy equivalent of 300 to 5,000 with (b) a dimer acid in the presence of an organic solvent having an alcoholic hydroxyl group at a concentration such that the solid content of both reactants (a) and (b) ranges from 60 to 90 percent by weight based on the total weight of the reaction mixture. An epoxy dimer acid ester resin prepared by the process and a coating therefrom are also disclosed. The coating is particularly useful for coating a coil of a steel sheet.

7 Claims, No Drawings

PROCESS FOR PREPARATION OF HIGH-MOLECULAR-WEIGHT EPOXY DIMER ACID ESTER RESIN

CROSS-REFERENCE TO RELATED APPLICATION

This is a continuation of application Ser. No. 07/816,778, filed Jan. 2, 1992 now abandoned, which is a continuation of application Ser. No. 07/619,810, filed Nov. 27, 1990 now abandoned, which, is a continuation of application Ser. No. 468,033, filed Jan. 22, 1990, now abandoned.

BACKGROUND OF THE INVENTION

The present invention relates to a process for preparing a high-molecular-weight epoxy dimer acid ester resin from an epoxy resin and a dimer acid, an epoxy dimer acid ester resin prepared thereby, and a coating prepared from the epoxy dimer acid ester resin. More specifically, the present invention relates to a process for preparing a high-molecular-weight epoxy dimer acid ester resin in the homogeneous state, without an inclusion of a gel component, at a high production speed and high yield. The epoxy dimer acid ester resin is particularly useful for preparing a paint for forming a coating requiring a high water resistance, high corrosion resistance, high adhesiveness and high processability, especially a coating of a coil of a steel sheet which is subjected to draw forming or shear processing.

It is known that the flexibility or processability of an epoxy dimer acid ester resin is improved with an increase in the resins molecular weight. If during polymerization the proportion of a dimer acid to be reacted with an epoxy resin to an epoxy resin is high, as the polymerization is advanced, gelation often occurs during the polymerization. Even if gelation does not occur, the reaction mixture becomes viscous and it is difficult to obtain a highly polymerized product. Therefore, it has been very difficult to manufacture a high-molecular-weight epoxy dimer acid ester resin on a large scale.

Where, in order to prevent gelation, the polymerization is terminated before all the acid groups of the dimer acid react, the storage stability of the product is poor.

Conventional processes for the preparation of an epoxy dimer acid ester resin include (1) a process comprising reacting a three-component mixture of a liquid epoxy resin, a bisphenol and a dimer acid in the presence of a catalyst in an inert organic solvent such as a ketone type solvent such as methylisobutylketone or an aromatic solvent such as xylene, and (2) a process comprising dissolving a solid epoxy resin having a relatively high epoxy equivalent (for example, at least 1,000) in an inert organic solvent such as methylisobutylketone, and adding a dimer acid to the solution to effect the polymerization reaction.

In each of the above mentioned conventional processes, however, the concentration of the epoxy resin is relatively high and the solid content is at least 90 percent by weight, and for these reasons an abrupt increase of the resin viscosity occurs with an advance of the polymerization. If the amount of the dimer acid added to the resin is large, the entire mixture in a reaction vessel sometimes gels and it becomes impossible to increase the polymerization degree. Moreover, even if the solid concentration of the reaction mixture is reduced, the viscosity is considerably increased when the degree of polymerization is increased. Therefore, a paint prepared from the obtained resinous product will have unsatisfactory wettability with an article to be coated with the paint.

In the above-mentioned process (1), the presence of the bisphenol and dimer acid causes dehydration esterification and formed water deactivates the catalyst resulting in insufficient polymerization.

In the above-mentioned process (2), the dissolution of the solid epoxy resin must be conducted at a high temperature of 80° to 100° C. for several hours. Furthermore, because of the presence of a microgel in the solid resin, the paint prepared from this resinous product is unsatisfactory because of various characteristics, for example, extractability in an organic solvent, processability, and corrosion resistance.

It is desired to provide a process for preparing an epoxy dimer acid ester resin having a high molecular weight to an extent such that a processability comparable to that of a thermoplastic resin is obtained.

SUMMARY OF THE INVENTION

According to the present invention, there is provided a process for the preparation of a high-molecular-weight epoxy dimer acid ester resin, preferably having a weight average molecular weight of 5,000 to 100,000 and an epoxy equivalent of 3,000 to 15,000, which comprises reacting (a) an epoxy resin which is a glycidyl ether of a dihydric phenol having a weight average molecular weight of 1,000 to 30,000 and an epoxy equivalent of 300 to 5,000 with (b) a dimer acid in the presence of an organic solvent having an alcoholic hydroxyl group at a concentration such that the solid content of both reactants (a) and (b), is 60 to 90 percent by weight, based on the total weight of the reaction mixture.

Another aspect of the present invention is an epoxy dimer acid ester resin prepared by the above-mentioned process.

Still another aspect of the present invention is a coating prepared from the epoxy dimer acid ester resin.

The coating advantageously has a high water resistance, high corrosion resistance, high adhesiveness, and high processability and is particularly useful for coating a coil of a steel sheet.

DETAILED DESCRIPTION OF THE INVENTION

Epoxy resin which can be used in the present invention are glycidyl ethers of a dihydric phenol having a weight average molecular weight of from 1,000 to 30,000, preferably from 2,000 to 20,000 and an epoxy equivalent of from 300 to 5,000, preferably from 500 to 4,000. Such epoxy resins are well described in the art, for example, "The Handbook of Epoxy Resins," by H. Lee and K. Neville, published in 1967 by McGraw-Hill, New York. The teachings of the book are incorporated herein their entirety by reference thereto.

Epoxy resins of particular interest in the practice of the present invention include the diglycidyl ethers of bisphenol compounds, particularly those compounds represented by the following general structural formula:

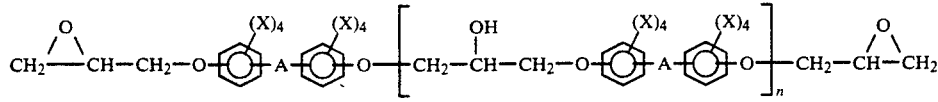

wherein each A is independently a divalent hydrocarbon group having from 1 to 8 carbon atoms

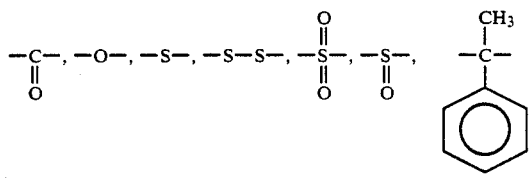

or a covalent bond; each X is independently hydrogen, halogen or an alkyl group of 1 to 4 carbon atoms and n has an average value of 3 to 90, preferably 6 to 60 depending on the desired molecular weight of the epoxy resin.

The use of an epoxy resin having a weight average molecular weight lower than 1,000 or an epoxy equivalent lower than 300 requires a large quantity of the dimer acid, resulting in a paint having poor adhesiveness, corrosion resistance, and wettability. The use of an epoxy resin having a weight average molecular weight higher than 30,000 or an epoxy equivalent higher than 5,000 results in the increase in the viscosity and a paint obtained from the resin has no practical utility.

The epoxy resins used in the process of the present invention can be prepared by any known techniques, for example, by reacting a bisphenol A type liquid epoxy resin with a bisphenol in the presence of a catalyst, if necessary in an inert organic solvent at a solid concentration of 70 to 100 percent by weight. The bisphenol A type liquid epoxy resin generally has a weight average molecular weight of 340 to 500 and an epoxy equivalent of 170 to 220. A product prepared from epichlorohydrin and bisphenol A by customary procedures and a commercially available product (for example, D.E.R. ® 383 or D.E.R. ® 331 supplied by The Dow Chemical Company) can be used. Preferable bisphenols include, for example, bisphenol A, bisphenol F and bisphenol AD.

The solid concentration at the reaction of the bisphenol A type liquid epoxy resin with the bisphenol is preferably 100 to 70 percent by weight, more preferably, 95 to 80 percent by weight based on the total weight of the reaction mixture. With the solid concentration lower than 70 percent by weight, a long reaction time is needed, whereby the manufacturing efficiency is reduced and the process becomes unsuitable for the industrial production. Where it is necessary to highly polymerize the bisphenol A type liquid epoxy resin with the bisphenol, to lower the melt viscosity and render the reaction mixture homogeneous, preferably the solid resin concentration is lowered.

The molar ratio of the bisphenol A type liquid epoxy resin to the bisphenol may range from 1/0.70 to 1/0.95, preferably from 1/0.75 to 1/0.9.

Preferable inert organic solvents for the reaction of the liquid epoxy resin with the bisphenol include those having a good compatibility with an epoxy resin and a boiling point higher than 130° C., preferably higher than 140° C. Examples of the inert organic solvent include glycol type solvents such as ethylene glycol and propylene glycol; glycol monoether type solvents such as ethylene glycol monoethyl ether and ethylene glycol monobutyl ether; acetate type solvents such as propylene glycol monomethyl ether acetate and butyl acetate; alcohol type solvents such as amyl alcohol and cyclohexanol; ketone type solvents such as cyclohexanone and diisobutylketone; and aromatic solvents such as xylene and Solvesso TM 100 supplied by Esso Standard Company. Of these organic solvents, nonalcoholic solvents such as an acetate type solvent, a ketone type solvent and an aromatic solvent are especially preferred. These solvents can be used singly or in the form of a mixture of two or more thereof.

Catalysts customarily used for the advancement reaction can be optionally used. Preferable catalysts include caustic soda, sodium carbonate, lithium chloride, tertiary amines such as benzyldimethylamine, quaternary ammonium salts such as tetramethylammonium bromide and triphenylphosphine. The catalyst may be used in a catalytically effective amount, for example, 0.001 to 1.0 percent by weight, more preferably 0.05 to 1.0 percent by weight, in the reaction mixture.

The reaction of the liquid epoxy resin with bisphenol A is preferably carried out at 120° to 230° C., more preferably at 130° to 210° C. The reaction is carried out either in a closed system or under reflux conditions. Superatmospheric to subatmospheric pressure can be used with normal pressure being preferred.

The reaction time can vary depending upon, for example, the molecular weight of the intended starting epoxy resin, the reaction temperature, the catalyst and the amount of the solvent. In general, an epoxy resin solution having a high concentration can be prepared in a relatively short time, for example, from 1 to 12 hours, more preferably from 1 to 6 hours.

According to the present invention, the starting epoxy resin can be prepared from, for example, the above-mentioned liquid epoxy resin and bisphenol A, and the obtained epoxy resin can be continuously reacted with the dimer acid in the same reaction vessel.

As used herein, the term "dimer acid" refers to a dimer of an unsaturated fatty acid or a mixture of the dimer and a small amount (up to 10 weight percent) of a monomer or trimer of the unsaturated fatty acid. Preferable unsaturated fatty acids include carboxylic acids having 12 to 24 carbon atoms and at least one unsaturated bond per molecule. Preferable acids having one unsaturated bond include, for example, oleic acid, elaidic acid and cetoleic acid. Preferable fatty acids having two unsaturated bonds include sorbic acid and linoleic acid. Preferable fatty acid having three or more of unsaturated bonds include linoleinic acid and arachidonic acid. In the process of the present invention, commercially available dimer acids such as Haridimer TM 300 supplied by Harima Kasei Kogyo and Versadyme TM 288 supplied by Henckel-Hakusui can be used.

In the process of the present invention, the esterification reaction between the epoxy resin and dimer acid is carried out in the presence of an organic solvent containing an alcoholic hydroxyl group. Preferable organic solvents having an alcoholic hydroxyl group include, for example, glycol type solvents such as ethylene glycol and propylene glycol; glycol monoether type solvents such as ethylene glycol monoethyl ether and ethylene glycol monobutyl ether; alcohol type solvents such as amyl alcohol and cyclohexanol. Preferably a solvent containing a primary alcoholic hydroxyl group is used. These solvents can be used singly or in the form of a mixture of two or more thereof.

In the esterification reaction with the dimer acid, an inert organic solvent not containing an alcoholic hydroxyl group, for example, a ketone type solvent, acetate type solvent or aromatic solvent or a mixture thereof can be used in addition to the organic solvent containing an alcoholic hydroxyl group.

At the reaction between the epoxy resin and dimer acid, the organic solvent having an alcoholic hydroxyl group is present at a concentration such that the solid content of both reactants is 60 to 90 percent by weight, preferably 70 to 90 percent by weight. At the solid concentration lower than 60 percent by weight, a long time is required for the reaction and the process is not practically suitable. At the solid concentration higher than 90 percent by weight, the melt viscosity becomes high and a homogeneous resin solution cannot be obtained.

The dimer acid may be used in an amount of 2 to 30 percent by weight, preferably 5 to 20 percent by weight, based on the total solid content of the reaction mixture. With the amount smaller than 2 percent by weight, the flexibility and processability of a coating of a paint prepared from the obtained epoxy dimer acid ester are sometimes not satisfactory. With the amount greater than 30 percent by weight, the softening point of the paint is lowered, and the heat resistance and strength are degraded.

The organic solvent having an alcoholic hydroxyl group may be used in an amount of 0.1 to 30 percent by weight, preferably 2 to 20 percent by weight, based on the total weight of the entire mixture. With the amount of the solvent smaller than 0.1 percent by weight, a masking effect described below is lowered. With the amount of the solvent greater than 30 percent by weight, the reaction must be carried out for a long time; the formation of an extractable low-molecular-weight component becomes conspicuous; and the physical properties of the paint prepared from the obtained epoxy dimer acid ester resin are degraded. Furthermore, the consumption of the carboxyl group is increased, and therefore, it is difficult to increase the polymerization degree.

Where the starting epoxy resin is prepared from the liquid epoxy resin and bisphenol, if an organic solvent containing an alcoholic hydroxyl group is used as the inert organic solvent (or as a part thereof), the epoxy resin and dimer acid can be reacted in the same solvent (or supplying an additional amount of the solvent for compensation of the solvent). Where the organic solvent containing an alcoholic hydroxyl group is added simultaneously with the addition of the dimer acid, preferably the solvent is added in an amount of 2 to 10 percent by weight. Moreover, a method can be adopted in which the esterification between the epoxy resin and dimer acid is initiated in the absence of the organic solvent containing an alcoholic hydroxyl group (or in the presence of a small amount of this organic solvent), the weight average molecular weight is increased to a predetermined level (for example, 50,000 to 70,000), and then the organic solvent containing an alcoholic hydroxyl group is added. Preferably, the final amount of the organic solvent containing an alcoholic hydroxyl group added is 5 to 30 percent by weight based on the entire reaction mixture. In this case, the polymerization can be advanced to a high degree without the risk of gelation. The formation of a low-molecular-weight product can be controlled.

The amount of the organic solvent not containing an alcoholic hydroxyl group, which is used according to need, is up to 40 percent by weight based on the entire reaction mixture.

The reaction between the epoxy resin and dimer acid is preferably carried out at from 130° to 200° C. in a closed system of under reflux conditions under subatmospheric to superatmospheric pressure preferably normal pressure. Preferably, the reaction is carried out in an atmosphere of an inert gas such as nitrogen for 0.5 to 20 hours, more preferably 0.5 to 10 hours, most preferably 0.5 to 5 hours.

According to the process of the present invention, a high molecular weight epoxy dimer acid ester can be prepared, which preferably has a weight average molecular weight of 5,000 to 100,000 and an epoxy equivalent of 3,000 to 15,000.

In general, the flexibility and processability can be improved in an epoxy resin by increasing the molecular weight. With the weight average molecular weight greater than 100,000, a prominent effect can not be expected.

In the process of the present invention, the high-molecular-weight epoxy dimer acid ester resin is obtained in the form of a concentrated solution. A paint, especially a paint to be used for coating a coil of a steel sheet, which is subjected to draw forming or shear processing, can be prepared by diluting, if necessary, the concentrated solution with an organic solvent and mixing the solution or dilution with a curing agent. Such solvents include, for example, the above-mentioned glycol type solvent, acetate type solvent, alcohol type solvent, ketone type solvent, aromatic solvent and mixtures thereof. Such curing agents include, for example, phenolic resin type curing agent, a urea resin type curing agent, a melamine resin type curing agent, and mixtures thereof.

The process of the present invention is characterized in that an organic solvent containing an alcoholic hydroxyl group is present at the esterification reaction between the epoxy resin and dimer acid. The action of the organic solvent containing an alcoholic hydroxyl group has not been completely elucidated, but it is believed that the functional mechanism is probably as follows. The present invention is not limited by the functional mechanism described below.

In the reaction mixture where the alcoholic hydroxyl group is not present, sometimes a cross linked structure is formed due to a reaction between one secondary hydroxyl group which is inevitably present in the recurring units of the epoxy group and the carboxyl group possessed by the dimer acid. Due to the formation of the crosslinked structure the molecular weight of the resin is abruptly increased resulting in the increase in the viscosity of the resin. The increase of the molecular weight adversely affects the processability and flexibility of a paint prepared from the obtained epoxy resin and degrades the wettability with an article to be coated.

Where the dimer acid and epoxy resin are present, the following reactions can be effected.

(i) The esterification between the carboxyl group in the dimer acid and the epoxy group in the epoxy resin.

(ii) The esterification between the carboxyl group in the dimer acid and the secondary hydroxyl group in the epoxy resin.

(iii) The intramolecular esterification reaction between the epoxy group and the secondary hydroxyl group in the epoxy resin by the catalytic action of the carboxyl group in the dimer acid.

Of these reactions, the reaction that mainly participates in the gelation is the esterification reaction (ii), and the reaction which contributes to the improvement of the flexibility and processability is thought to be the esterification reaction (i).

If a solvent having an alcoholic hydroxyl group, preferably a primary alcoholic hydroxyl group is present in the above-mentioned reaction system, the hydroxyl group exerts the function of masking the esterification reaction (ii). More specifically, the reactivity of the primary alcoholic hydroxyl group with the carboxyl group of the dimer acid is intermediate between the reactivity with the epoxy group and the reactivity with the secondary hydroxyl group, and therefore, the masking effect on the reaction (i) is lower than the effect on the reaction (ii).

The present invention will now be described in detail with reference to the following examples which are not to be construed as limiting. All of "percent" and "parts" in the examples are by weight unless otherwise indicated.

EXAMPLE 1

A reaction vessel was charged with 500 parts of liquid epoxy resin D.E.R TM 383 (liquid epoxy resin supplied by The Dow Chemical Company, epoxy equivalent=176 to 183, viscosity=9,000 to 10,500 cst at 25° C.), 287 parts of bisphenol A, 118 parts of Solvesso TM 100 (aromatic mixed solvent supplied by Esso Standard Company), 39 parts of ethylene glycol monobutyl ether, and 0.5 part of ethyltriphenyl phosphonium phosphate. The mixture was heated at 160° C. in a nitrogen stream and reacted for 2 hours. A part of the formed epoxy resin was taken out and analyzed. It was found that the weight average molecular weight was 17,000 and the epoxy equivalent was 3,000 . Then 51 parts of Haridimer TM 300 (C$_{36}$-dimer acid supplied by Harima Kasei Kogyo; monomer=1 percent, dimer=97 percent and trimer=2 percent) were added and reaction was carried out at 160° C. for 1.5 hours, propylene glycol methyl ether acetate was then added, and the mixture was cooled to 80° C. to obtain a 25 percent solution (950 cst at 25° C.) of an epoxy dimer acid ester resin having an epoxy equivalent of 11,000 and a weight average molecular weight 94,000.

EXAMPLE 2

A reaction vessel was charged with 500 parts of liquid epoxy resin D.E.R. TM 383, 272 parts of bisphenol A, 75 parts of Solvesso TM 100, and 0.5 parts of ethyltriphenyl phosphonium phosphate, and reaction was carried out at 160° C. in a nitrogen stream for 1 hour. A part of the formed epoxy resin was taken out and analyzed. It was found that weight average molecular weight was 12,000 and the epoxy equivalent was 2,200. Then 86 parts of Haridimer TM 300 and 53.6 parts of Solvesso TM 100 were added and reaction was carried out at 160° C. for 2 hours. And then 43 parts of ethylene glycol monobutyl ether was added and reaction was carried out at 160° C. for 1 hour. Propylene glycol methyl ether acetate was added and the reaction mixture was cooled to 80° C. to obtain a 25 percent solution (1,000 cst at 25° C.) of an epoxy dimer acid ester having an epoxy equivalent of 9,000 and a weight average molecular weight of 80,000.

EXAMPLE 3

A reaction vessel was charged with 500 parts of liquid epoxy resin D.E.R. TM 383, 233 parts of bisphenol A, 131 parts of Solvesso TM 100, and 0.5 part of ethyltriphenyl phosphonium phosphate. The mixture was heated and reaction was carried out in a nitrogen stream for 1 hour. A part of the formed epoxy resin was taken out and analyzed. It was found that the weight average molecular weight was 4,500 and the epoxy equivalent was 1,000. Then 185 parts of Hardimer TM 300 and 336 parts of Solvesso TM 100 were added and reaction was carried out at 150° C. for 4 hours. And then 25 parts of ethylene glycol monobutyl ether was added and reaction was carried out for about 1.5 hours. Propylene glycol methyl acetate was added to cool the reaction mixture to 80° C. and dilute the reaction mixture, whereby a 25 percent solution (1,000 cst at 25° C.) of an epoxy dimer acid ester resin having an epoxy equivalent of 9,000 and a weight average molecular weight of 85,000 was obtained.

EXAMPLE 4

A reaction vessel was charged with 500 parts of liquid epoxy resin D.E.R. TM 383, 272 parts of bisphenol A, 100 parts of Solvesso TM 100, and 0.5 part of ethyltriphenyl phosphonium phosphate as the catalyst. The reaction was carried out at 160° C. for 1 hour. A part of the formed epoxy resin was taken out and analyzed. It was found that the weight average molecular weight was 12,000 and the epoxy equivalent was 2,200. Then 56 parts of Hardimer TM 300 was added and the mixture was heated at 160° C. and a reaction mixture was carried out for 3 hours. And then, 50 parts of ethylene glycol monobutyl ether was added and reaction was carried out at 160° C. for 30 minutes. Propylene glycol methyl ether acetate was then added to cool the reaction mixture to 80° C. to obtain a 25 percent solution (500 cst at 25° C.) of an epoxy dimer acid ester resin having an epoxy equivalent of 6,000 and a weight average molecular weight of 55,000.

COMPARATIVE EXAMPLE 1

A reaction vessel was charged with 500 parts of liquid epoxy resin D.E.R. TM 383, 287 parts of bisphenol A, 100 parts of Solvesso TM 100, and 0.5 part of ethyltriphenyl phosphonium phosphate. The reaction was carried out at 160° C. in a nitrogen stream. A part of the epoxy resin was taken out and analyzed. It was found that the weight average molecular weight was 15,000 and the epoxy equivalent was 2,900. Then 51 parts of Hardimer TM 300 was added and reaction was carried out at 160° C. for 1 hour. Propylene glycol methyl ether acetate was then added to cool the reaction mixture to 80° C. and dilute the reaction mixture. A 25.9 percent solution (4,200 cst at 25° C.) of an epoxy dimer acid ester resin having an epoxy equivalent of 8,600 and a weight average molecular weight of 180,000 was obtained.

COMPARATIVE EXAMPLE 2

A reaction vessel was charged with 500 parts of liquid epoxy resin D.E.R. TM 383, 233 parts of bisphenol A, 131 parts of Solvesso TM 100, and 0.5 parts of ethyltriphenyl phosphonium phosphate. The mixture was heated at 160° C. in a nitrogen stream and reacted for 1 hour. A part of the formed epoxy resin was taken out and analyzed. It was found that the weight average molecular weight was 5,000 and the epoxy equivalent was 1,100. Then 185 parts of Haridimer TM 300 was added and reaction was carried out at 160° C., and since the reaction mixture abruptly became viscous after 4 hours, the reaction was stopped. The obtained epoxy dimer acid ester resin had an epoxy equivalent of 6,000 and a weight average molecular weight of 83,000. The viscosity of a 25 percent solution obtained by diluting the concentrated solution with propylene glycol methyl ether was 2,000 cst at (25° C.).

COMPARATIVE EXAMPLE 3

A reaction vessel was charged with 500 parts of liquid epoxy resin D.E.R. TM 383, 233 parts of bisphenol A and 0.5 part of ethyltriphenyl phosphonium phosphate. The mixture was heated at 160° C. in a nitrogen stream and reacted for 1 hour. A part of the formed epoxy resin was taken out and analyzed. It was found that the weight average molecular weight was 6,000 and the epoxy equivalent was about 1,100. Then 154 parts of Haridimer TM 300 and 100 parts of Solvesso TM 100 were added and reaction was carried out at 160° C. Gelation occurred after 2.5 hours. The formed gel was analyzed and it was found that the epoxy equivalent was about 4,000.

EVALUATION OF COATINGS

A phenolic resin type curing agent (resol) was diluted with propylene glycol methyl ether acetate to form a 25 percent dilution. The dilution was added to each of the 25 percent solutions of epoxy dimer acid ester resins prepared in Examples 1 through 4 and Comparative Examples 1 through 3 so that the amount of the curing agent dilution was 20 percent by weight. The obtained paint was coated on a phosphate-treated steel sheet having a thickness of 0.2 mm by using a bar coater, and the coated steel sheet was dried at 210° C. for 14 minutes to obtain a sample. The thickness of the coating after the drying was about 5 μm.

The following properties of the coatings were examined.

(1) Processability Test

The twice-folded sample was located below, and an iron weight having a weight of 2 kg was allowed to drop onto the sample from a height of 75 cm. The state of the cracking of the bent portion was determined by the electric current detection method.

0: smaller than 0.2 mA

Δ: 0.2 mA or larger (2) Methylethylketone Extraction (MEK) Test

The sample was immersed in boiling methylethylketone for 1 hours, and the change (decrease) of the weight of the coating was determined.

0: less than 20 percent

Δ: 20 percent or more

The physical properties of the epoxy dimer acid ester resins obtained in Examples 1 through 4 and Comparative Examples 1 through 3 and the physical properties of the coatings are shown in Table 1.

TABLE 1

| | | Example No. | | | | Comparative Example No. | | |
|---|---|---|---|---|---|---|---|---|
| | | 1 | 2 | 3 | 4 | 1 | 2 | 3 |
| Amount (%) of added dimer acid (based on total solids) | | 6.1 | 10.1 | 20.1 | 7.1 | 6.1 | 20.1 | 7.1 |
| Epoxy equivalent | | 11000 | 9000 | 9000 | 6000 | 8600 | 6000 | 4000 |
| Weight average molecular weight | | 94000 | 80000 | 85000 | 55000 | 180000 | 83000 | — |
| Viscosity (cst) (25° C., 25% solution) | | 950 | 1000 | 1000 | 500 | 4200 | 2000 | — |
| Esterification reaction with dimer acid | | advanced | advanced | advanced | advanced | advanced | abrupt increase of viscosity during reaction | gelation during reaction |
| Evaluation of coating | Processability | 0 | 0 | 0 | 0 | 0 | — | Formation of paint impossible |
| | Extraction with MEK | 0 | 0 | 0 | 0 | 0 | — | Formation of paint impossible |

What is claimed is:

1. A process for preparing an epoxy dimer acid ester resin having a weight average molecular weight of about 5,000 to about 100,000 and an epoxy equivalent of about 3,000 to about 15,000, which comprises reacting (a) at least one epoxy resin which is a glycidyl ether of a dihydric phenol having a weight average molecular weight of from about 4,500 to about 30,000 and an epoxy equivalent weight of from about 1,000 to about 5,000 with (b) at least one dimer acid in the presence of an organic solvent having an alcoholic hydroxyl group, said organic solvent having a concentration such that the solid content of both reactants (a) and (b) ranges from about 60 to about 90 percent by weight, based on the total weight of the reaction mixture.

2. A process according to claim 1 wherein the reaction temperature ranges from about 130° to about 200° C.

3. A process according to claim 1 wherein the reaction time ranges from about 0.5 to about 20 hours.

4. A process according to claim 1 wherein the epoxy resin is selected from the group consisting of a glycidyl ether of bisphenol A, a glycidyl ether of bisphenol F and a glycidyl ether of bisphenol AD.

5. A process according to claim 1 wherein the dimer acid is a dimer of a carboxylic acid having about 12 to about 24 carbon atoms.

6. A process according to claim 1 wherein the organic solvent is selected from the group consisting of ethylene glycol, propylene glycol, ethylene glycol monoethyl ether, ethylene glycol monobutyl ether, amyl alcohol and cyclohexanol.

7. A process according to claim 1 wherein the epoxy resin and the dimer acid are used in such amount that the amount of the dimer acid is about 2 to about 30 percent by weight, based on the total solid content of the reaction mixture.

* * * * *